| United States Patent [19]
Hildebrand et al.

[11] Patent Number: 4,912,159
[45] Date of Patent: Mar. 27, 1990

[54] STABILIZER MIXTURE FOR MOLDING COMPOUNDS BASED ON POLYMERS OF VINYL CHLORIDE; USE OF SAID MIXTURE; AND MOLDING COMPOUNDS

[75] Inventors: Thomas Hildebrand, Dortmund; Bruno Kemper, Haltern, both of Fed. Rep. of Germany

[73] Assignee: Huels Aktiengesellschaft, Marl, Fed. Rep. of Germany

[21] Appl. No.: 299,416

[22] Filed: Jan. 23, 1989

[30] Foreign Application Priority Data

Feb. 26, 1988 [DE] Fed. Rep. of Germany ....... 3806094

[51] Int. Cl.$^4$ .............................................. C08K 5/36
[52] U.S. Cl. .................................... 524/289; 524/399
[58] Field of Search ............... 524/182, 181, 289, 399; 562/432; 560/18; 252/406

[56] References Cited

U.S. PATENT DOCUMENTS 3,078,290 2/1963 Hechenbleikner et al. ........ 524/289
3,600,444 8/1971 Dachs ................................. 562/432

FOREIGN PATENT DOCUMENTS 224679A 6/1987 European Pat. Off. ............ 524/289

*Primary Examiner*—Veronica P. Hoke
*Attorney, Agent, or Firm*—Oblon, Spivak, McClelland, Maier & Neustadt

[57] ABSTRACT

A stabilizer mixture for molding compounds based on polymers of vinyl chloride; use of said mixture; and molding compounds is disclosed. The heretofore known physiologically unobjectionable stabilizer systems have the disadvantage of disagreeable odor, as well as inadequate initial stability. In addition to physiologically unobjectionable stabilizers (e.g., metal soaps, salts of aromatic carboxylic acids, or metal phenolates), co-stabilizers of the present invention are used, in the form of derivatives of thiosalicylic acid esters masked at the mercapto group by monothioacetal formation. The field of application is hard and soft PVCs.

6 Claims, No Drawings

STABILIZER MIXTURE FOR MOLDING COMPOUNDS BASED ON POLYMERS OF VINYL CHLORIDE; USE OF SAID MIXTURE; AND MOLDING COMPOUNDS

BACKGROUND OF THE INVENTION

1. Field of the Invention

The invention relates to hard or softened, stabilized thermoplastic molding compounds based on polyvinyl chloride (PVC) or on polymers containing chiefly vinyl chloride.

2. Discussion of the Background

It is known that chlorine-containing polymers readily undergo thermal breakdown, e.g., when being treated. This leads to undesired coloration, and degradation of mechanical properties. In order to avoid such breakdown, stabilizing agents are added to polymers prior to processing. For PVC and mixed polymers containing chiefly vinyl chloride, the principal stabilizers used are organotic compounds, inorganic and organic lead salts, organoantimony compounds, or combinations of cadmiun- and barium carboxylates. These so-called primary stabilizers frequently have co-stabilizers added to them to improve their effectiveness. The operation of primary stabilizers, co-stabilizers, and their synergy, is described in the literature, e.g., in Nass, L.I., 1980, "Heat Stabilizers", in "Kirk-Othmer Encyclopedia of Chemical Technology", Vol. 12, 3rd Ed., pub. John Wiley & Sons, p.225.

The stabilizers described are quite effective. However, compounds of lead, cadmium, and antimony are not usable for all applications, because of their toxicity. In particular, they cannot be used in food packaging materials or in the medical area. Organotin compounds, many of which are toxicologically acceptable, are unsuitable for wide application because they are too expensive, i.e., they are not readily available and cannot be produced inexpensively.

Thus, there is a demand for stabilizer systems which are comprised of components which are physiologically unobjectionable, inexpensive, and readily available. One might consider using fatty acid salts of calcium and zinc as primary stabilizers, along with possible co-stabilizers such as epoxy compounds, organic phosphites, polyhydric alcohols, or 1,3-diketones. The disadvantage of such stabilizer systems is low shelf life and/or undesirable base coloration of the polymer compound. There are co-stabilizers for zinc-based stabilizer systems, which co-stabilizers improve the initial and long term effectiveness of the primary systems; such co-stabilizers are namely thioacetals and monothioacetals (Ger. OS 35 42 862). These compounds have the disadvantage of disagreeable odor and an undesirable base color of the polymer compound (see Table 2).

SUMMARY OF THE INVENTION

Accordingly, one object of this invention is to provide a physiologically unobjectionable, inexpensive, and readily available co-stabilizer. It is another object of the invention to use such a co-stabilizer with physiologically unobjectionable primary stabilizers.

It is a further object of the invention to produce a molding compound of polymers of vinyl chloride with a stabilizer system. It is another object of the invention to use such a stabilizer mixture to stabilize molding compounds of polymers and vinyl chloride.

The drawbacks of the prior art are overcome by the preparation and use of a stabilizer mixture for stabilizing molding compounds based on polymers of vinyl chloride, which mixture contains at least one primary stabilizer and a co-stabilizer which is a compound of formula I:

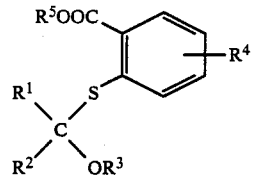

where $R^1$ and $R^2$ may be identical or different and each represents a straight chain or branched alkyl or alkenyl group with 1–20, preferably 1–10, C atoms, or where $R^1$ is hydrogen or an aryl group, which, if desired, is substituted; and $R^2$ is a straight chain or branched alkyl- or alkenyl group having 1 to 20, preferably 1 to 10, carbon atoms;

$R^3$ and $R^5$ may be identical or different and each represents a straight chain or branched alkyl group with 1–22, preferably 4–10, C atoms; and $R^4$ represents straight chain or branched alkyl or alkenyl groups with 1–22, preferably 1–10, carbon atoms, or substituted or unsubstituted aryl groups (preferably phenyl), or hydrogen.

DETAILED DESCRIPTION OF THE PREFERRED EMBODIMENTS

By use of the inventive stabilizer mixture, molding compounds based on polymers of vinyl chloride are obtained which contain at least one primary stabilizer and a co-stabilizer which is a compound of formula I:

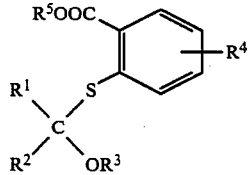

where $R^1$ and $R^2$ may be identical or different and each represents a straight chain or branched alkyl or alkenyl group with 1–20, preferably 1–10, C atoms, or $R^1$ is hydrogen or an aryl group, which, if desired, is substituted; and $R^2$ is a straight chain or branched alkyl- or alkenyl group having 1 to 20, preferably 1 to 10, carbon atoms;

$R^3$ and $R^5$ may be identical or different and each represents a straight chain or branched alkyl or alkenyl group with 1–22, preferably 4–10, C atoms; and $R^4$ represents straight chain or branched alkyl or alkenyl groups with 1–22, preferably 1–10, C atoms, or substituted or unsubstituted aryl groups, or hydrogen.

Preferred are stabilized molding compounds wherein $R^1$, $R^2$, and $R^5$ are straight chain or branched alkyl groups with 1–20 C atoms, $R^3$ is a straight chain or branched group with 4–20 C atoms, and $R^4$ is hydrogen.

The stabilized molding compounds contain, as a preferred embodiment of a primary stabilizer, at least one fatty acid salt of calcium or zinc. They may also contain lubricants and other customary adjuvants to aid in processing.

In formula I, $R^1$ through $R^5$ may independently by any of the following groups: butyl, isobutyl, pentyl, isopentyl, hexyl, isohexyl, heptyl, isoheptyl, octyl, isooctyl, nonyl, isononyl, decyl, isodecyl, dodecyl, isodeodecyl, tridecyl, tetradecyl, hexadecyl, octadecyl, or eicosanyl; also methyl, ethyl, propyl, or isopropyl. $R^3$ may also be, e.g., docosanyl. $R^1$, $R^2$ and $R^4$ may also independently be propenyl, butenyl, pentenyl, hexenyl, heptenyl, octenyl, nonenyl, decenyl, dodecenyl, tetradecenyl, hexadecenyl, or octadecenyl.

Further, $R^1$ and $R^2$ may each independently be an unsubstituted or substituted aryl group, e.g., phenyl, o-tolyl, m-tolyl, p-tolyl, p-tert.-butylphenyl, p-nonylphenyl, p-dodecylphenyl, o-hydroxyphenyl, m-hydroxyphenyl, p-hydroxyphenly, o-chlorophenyl, m-chlorophenyl, or p-chlorophenyl.

The inventively stabilized molding compounds based on polymers of vinyl chloride contain co-stabilizers which are derivatives of thiosalicyclic acid esters masked at the mercapto group by monothioacetal formation. These co-stabilizers do not have the drawback of a disagreeable odor. In connection with the invention it has been observed that these compounds make an appreciable contribution to the stabilizing action of fatty acid salts of zinc and calcium. The positive effect of the monothioacetals of thiosalicyclic acid esters shows a marked improvement in the base color.

The polymers of vinyl chloride on which he inventively stabilized molding compounds are based are comprised of PVC or mixed polymers of vinyl chloride, which may be manufactured by known methods, as described, e.g., in the monograph of Kainer, 1965, "PVC and vinyl chloride mixed polymers", pub. Spring-Verlag, pp. 7–59 (polymerization in the mass, in suspension, or in emulsion). The mixed polymers may contain comonomers to the extent of up to 30 wt. %. The comonomers may be, e.g., vinyl acetate, vinylidene chloride, vinyl ether, acrylonitrile, acrylic acid esters, maleic acid mono-or diesters, or olefins. Graft polymers may also be used, which may be manufactured as descried, e.g., in the monograph of Kaine, ibid., pp. 111–114.

The compounds of formula I may be manufactured by current methods of organic synthesis, as described, e.g., in Houben-Weyl, 1955, "Methoden der organischen Chemie", Vol. 9. Preferably, compounds of formula I are manufactured by, e.g., acid- or base-catalyzed addition of thiosalicyclic acid esters to open chain enol ethers of aliphatic carbonyl compounds.

The monothioacetals of formula I are manufactured by another, new process, by reacting thiosalicyclic acid esters with enol ethers such as isobutyl vinyl ether, tridecyl vinyl ether, hexadecyl vinyl ether, and octadecyl vinyl ether under acid catalysis conditions.

The derivative of the thiosalicylic acid may be, e.g., the butyl, 2-ethylhexyl, or methyl ester.

A suitable manufacturing method is described in the Experimental Part, infra.

Examples of compounds of formula I are:
(1) S-(1-isobutoxyethyl)thiosalicylic acid methyl ester;
(2) S-(1-isobutoxyethyl)thiosalicylic acid butyl ester;
(3) S-(1-isobutoxyethyl)thiosalicylic acid 2-ethylhexyl ester;
(4) S-(1-ethoxyethyl)thiosalicylic acid methyl ester;
(5) S-(1-ethoxyethyl)thiosalicylic acid butyl ester;
(6) S-(1-ethoxyethyl)thiosalicylic acid 2-ethylhexyl ester;
(7) S-(1-octadecyloxyethyl)thiosalicylic acid methyl ester;
(8) S-(1-octadecyloxyethyl)thiosalicylic acid butyl ester;
(9) S-(1-octadecylosyethyl)thiosalicylic acid 2-ethylhexyl ester;
(10) S-(1-butyltriglycolyloxyethyl)thiosalicyclic acid methyl ester;
(11) S-(1-butyltriglycolyloxyethyl)thiosalicylic acid butyl ester;
(12) S-(1-butyltriglycolyloxyethyl)thiosalicylic acid 2-ethylhexyl ester;
(13) S-(1-nonyloxyethyl)thiosalicylic acid methyl ester;
(14) S-(1-nonyloxyethyl)thiosalicylic acid butyl ester;
(15) S-(1-nonyloxyethyl)thiosalicylic acid 2-ethylhexyl ester;
(16) S-(1-tridecyloxyethyl)thiosalicylic acid methyl ester;
(17) S-(1-tridecyloxyethyl)thiosalicylic acid butyl ester;
(18) S-(1-tridecyloxyethyl)thiosalicylic acid 2-ethylhexyl ester.

The primary stabilizers used in the inventively stabilized molding compounds may be the customary compounds, e.g., metal soaps, salts of aromatic carboxylic acids, and/or metal phenolates.

Examples of preferred metal soaps are salts of calcium, barium, or zinc, derived from fatty acids with 8–36, preferably 8–22, C atoms. Particularly preferred candidates are caprylaters, caprates, laurates, myristates, palmitates, stearates, and behenates. Salts of branched fatty acids may also be used, e.g. of 2-ethylhexanoic acid, 2-octyldecanoic acid or tetradecyloctadecanoic acid, or even of hydroxy fatty acids such as 9(10)-hydroxystearic acid or 9,10-dihydroxystearic acid. The metal soaps may comprise salts of single fatty acids or of mixtures of fatty acids (as are obtained from natural fats). Preferred candidates as salts of aromatic carboxylic acids are the calcium, barium, and zinc salts of benzoic acid, and the substituted benzoic acid esters, particularly the alkyl-substituted benzoic acids. Phenolates which may be used are the following: methyl-, tert.- butyl-, nonyl-, and dodecylphenolates, or -naphthenates, of calcium, barium, or zinc.

As a rule, the stabilized molding compounds contain 0.02–5, preferably 0.05–5, parts by weight compounds of formula I per 100 parts by weight polymer. The primary stabilizers may be present in the amount of 0.05–5, preferably 0.1–2, parts by weight per 100 parts by weight polymer. Preferably the inventive molding compounds contain 0.1–3 parts by wt. calcium soap and/or 0.1–3 parts by wt. barium soap and/or 0.1–3 parts by wt. zinc soap, per 100 parts by wt. polymer. The soaps are preferably derived from fatty acids with 8–22 C atoms, and generally their total amount does not exceed 3 parts by wt. per 100 parts by wt. polymer.

The inventively stabilized molding compounds may be manufactured by customary methods, e.g., by simple mechanical mixing of the components in conventional mixers. In this mixing process, additional customary processing aid materials may be mixed in, e.g., lubricants (such as montan waxes or polyol partial esters), softeners, fillers, light-stabilizers, or additional co-stabilizers, e.g., epoxidized fatty acid esters, polyols, phosphites (preferably alkylaryl phosphites), or 1,3-diketones. Homogenous distribution of the stabilizers in the PVC can be accomplished, e.g., with the aid of a double-roll mixer, at 150°-200° C. The Examples presented hereinbelow provide further illustration of the invention, and evidence of the surprising technical advance thereof.

Manufacturing the Compounds of Formula I

In general to make a compound of formula I, an alpha-beta unsaturated ether and thiosalicylic acid of a 1:1.1 molar ratio are dissolved in an inert solvent. The mixture is acidified preferably with sulfuric acid. After the mixture has been allowed to react at room temperature, standard purification techniques are used to purify the product of formula I. The specifics of this reaction are given in the following Example.

EXAMPLES 93.3 g (0.35 mol) thiosalicylic acid 2-ethylhexyl ester were dissolved in 300 ml dried MTB ether, and 10 drops conc. sulfuric acid was added. A solution of 38.6 g (0.39 mol) isobutyl vinyl ether (freshly distilled) in 300 ml dried MTB ether was added dropwise, with stirring, over a period of 170 min at room temperature, and the mixture was stirred 60 min at room temperature. The reaction mixture was washed twice with 100 ml 3% sodium bicarbonate solution, and the organic phase was dried with sodium sulfate. The drying agent was filtered out, and volatiles were removed from the filtrate in vacuum (c. 0.4 mbar). According to GC, the residue contained: 93.8 wt. % of the monothioacetal and 6.2 wt. % thiosalicylic acid ethylhexyl ester. For purification, the solution was adsorptively filtered (column chromatography: 1st layer 122 g alumina, neutral, activation level III; 2nd layer 129 g alumina, neutral, activation level III, and 5.3 g activated carbon; carrier c. 300 ml diethyl ether).

After the solvent was distilled off, the product comprised 116 g 99.3% S-(1-isobutoxyethyl)thiosalicylic acid 2-ethylhexyl ester, in the form of a colorless oil.

The same method under identical conditions may be used for the addition of other thiosalicylic acid esters to other vinyl ethers.

Manufacture and Testing of Rolled Sheet

The effect of the stabilizer combinations was tested by determining the static thermal stability of rolled sheet. Stabilizer combinations, possibly also with softeners and agents which promote processibility, were mixed 30 sec with PVC in a laboratory mill and then were processed to 1 mm thick rolled sheet by means of a synchronized double roll mill at a roll temperature of 170° C., with a rolling time of 5 min. Strips with dimensions 10×250 mm were cut from the rolled sheets. These were then thermally stressed in a special oven (Metrastat type "Sigma") at 180° C. In this thermal exposure, the test strips were continuously removed from the hot zone; color changes indicated the effect of the stabilizers.

The following mixture were employed (p.w. - parts by wt.):

Mixture A 100 p.w. PVC (produced by suspension polymerization) (K-value=70) (Vestolit ® S 7054, supplied by Huels AG, of Marl);
30 p.w. Dioctyl phthalate;
0 5 p.w. Zinc stearate;
1.0 p.w. Calcium stearate;
0.2 p.w. Co-stabilizer

Mixture B 100 p.w. PVC (produced by suspension polymerization) (K-value=70) (Vestolit ® S 7054, supplied by Huels AG, of Marl);
30 p.w. Dioctyl phthalate;
0.3 p.w. Zinc stearate;
p.w. Barium stearate;
0.2 p.w. Co-stabilizer To produce the inventive PVC molding compounds, the following co-stabilizers are added to the mixtures A and B:

1 = S-(1-isobutoxyethyl)thiosalicylic acid methyl ester;
2 = S-(1-octadecyloxyethyl)thiosalicylic acid methyl ester;
3 = S-(1-isobutoxyethyl)thiosalicylic acid 2-ethylhexyl ester;
4 = S-(1-isobutoxyethyl)thiosalicylic acid butyl ester;
5 = S-(1-butyltriglycolyloxyethyl)thiosalicylic acid butyl ester;

The mixtures A and B were processed to form test strips, as described.

Table 1 gives the times (minutes) at which the first coloration of the strips concurred at 180° C., and at which loss of stability was apparent (blackening):

TABLE 1

|  |  | 1 | 2 | 3 | 4 | 5 |
|---|---|---|---|---|---|---|
| First coloration | A | 40 | 40 | 40 | 40 | 40 |
| Loss of stability |  | 50 | 65 | 65 | 50 | 65 |
| First Coloration | B | 55 | 55 | 60 | 50 | 50 |
| Loss of stability |  | 65 | 65 | 70 | 65 | 65 |

The following comparison tests against the relevant state of the art (disclosed in Ger. OS 35 42 862) were carried out. The course of the coloration of the test strips during the thermal stressing is approximated using the following scale:

| 0 | 1 | 2 | 3 | 4 | 5 | 6 | 7 | 8 | 9 | 10 |
|---|---|---|---|---|---|---|---|---|---|---|
| Colorless |  | Yellow |  |  |  |  | Orange |  |  | Black |

TABLE 2

| Co-stabilizer/ mixture | Exposure (minutes) at 180° C. | | | | | | | |
|---|---|---|---|---|---|---|---|---|
|  | 0 | 10 | 20 | 30 | 40 | 50 | 60 | 70 |
|  |  |  |  | Color |  |  |  |  |
| 6*/A (for comparison according to Ger. OS 35 42 862) | 1 | 2 | 2 | 2 | 2 | 3 | 4 | 9 |
| 3/A (according to the invention | 0 | 0 | 0 | 0 | 1 | 2 | 9 | 10 |
| 6*/B (for comparison) according to Ger. OS 35 42 862) | 2 | 4 | 4 | 4 | 3 | 3 | 4 | 10 |
| 3/B (according to the invention | 0 | 0 | 0 | 0 | 0 | 0 | 0 | 10 |

*Co-stabilizer 6 = s-(1-isobutoxyethyl)thioglycolic acid 2-ethylhexyl ester.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A stabilizer mixture for molding compounds based on polymers of vinyl chloride, which comprises a mixture containing at least one primary stabilizer and co-stabilizer which is a compound of formula I:

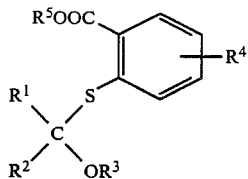

where
R$^1$ and R$^2$ are each independently a straight chain or branched C$_{1-20}$ alkyl or C$_{1-20}$ alkenyl group, or R$^1$ is hydrogen, a C$_{6-12}$ aryl group or a C$_{6-12}$ substituted aryl group, and R$^2$ is a straight chain or branched C$_{1-20}$ alkyl or C$_{1-20}$ alkenyl group;
R$^3$ and R$^5$ are each independently a straight chain or branched C$_{1-22}$ alkyl group; and
R$^4$ is a straight chain or branched C$_{1-22}$ alkyl or C$_{1-22}$ alkenyl group or unsubstituted C$_{6-12}$ aryl group, a substituted C$_{6-12}$ aryl group, or hydrogen.

2. A method of use of a stabilizer mixture containing at least one primary stabilizer and a co-stabilizer which is a compound of formula I:

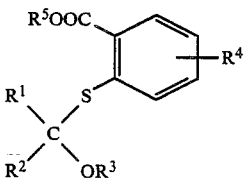

where
R$^1$ and R$^2$ are each independently a straight chain or branched C$_{1-20}$ alkyl or C$_{1-20}$ alkenyl group, or R$^1$ is hydrogen, a C$_{6-12}$ aryl group or a C$_{6-12}$ substituted aryl group, and R$^2$ is a straight chain or branched C$_{1-20}$ alkyl or C$_{1-20}$ alkenyl group;
R$^3$ and R$^5$ are each independently a straight chain or branched C$_{1-22}$ alkyl group; and
R$^4$ is a straight chain or branched C$_{1-22}$ alkyl or C$_{1-22}$ alkenyl group or unsubstituted C$_{6-12}$ aryl group, a substituted C$_{6-12}$ aryl group, or hydrogen, which comprises incorporating 0.02–5 parts by weight of the compound of formula I per 100 parts by weight of a polymer of vinyl chloride and 0.05–5 parts by weight of the at least one primary stabilizer per 100 pats by weight of the polymer of vinyl chloride.

3. A stabilized molding composition comprising a polymer of vinyl chloride having incorporated therein a primary stabilizer and a co-stabilizer which is a compound of formula I:

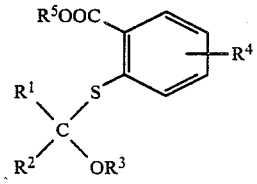

where
R$^1$ and R$^2$ are each independently a straight chain or branched C$_{1-20}$ alkyl or C$_{1-20}$ alkenyl group, or R$^1$ is hydrogen, a C$_{6-12}$ aryl group or a C$_{6-12}$ substituted aryl group, and R$^2$ is a straight chain or branched C$_{1-20}$ alkyl or C$_{1-20}$ alkenyl group;
R$^3$ and R$^5$ are each independently a straight chain or branched C$_{1-22}$ alkyl group; and
R$^4$ is a straight chain or branched C$_{1-22}$ alkyl or C$_{1-22}$ alkenyl group or unsubstituted C$_{6-12}$ aryl group, a substituted C$_{6-12}$ aryl group, or hydrogen.

4. The stabilized molding compound according to claim 3, characterized in that, in formula I:
R$^1$ and R$^2$ each represent a straight chain or branched alkyl or alkenyl group with 1–10 C atoms; and
R$^3$ and R$^5$ each represent a straight chain or branched alkyl group with 4–10 C atoms.

5. The stabilized molding composition according to claim 4, characterized in that, in formula I:
R$^1$, R$^2$ and R$^5$ each represent a straight chain or branched alkyl group with 4–10 C atoms;
R$^3$ represents a straight chain or branched alkyl group with 4–10 C atoms; and
R$^4$ represents hydrogen.

6. A stabilized molding composition according to claim 3 wherein the primary stabilizer comprises at least one fatty acid salt of Ca or Zn.

* * * * *